US012567936B2

(12) United States Patent
Manolakos et al.

(10) Patent No.: US 12,567,936 B2
(45) Date of Patent: Mar. 3, 2026

(54) CHANNEL STATE INFORMATION REPORT FOR BUNDLED DOWNLINK SHARED CHANNEL

(71) Applicant: QUALCOMM Incorporated, San Diego, CA (US)

(72) Inventors: Alexandros Manolakos, Escondido, CA (US); Hung Dinh Ly, San Diego, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 858 days.

(21) Appl. No.: 17/757,992

(22) PCT Filed: Feb. 16, 2021

(86) PCT No.: PCT/US2021/018243
§ 371 (c)(1),
(2) Date: Jun. 24, 2022

(87) PCT Pub. No.: WO2021/173385
PCT Pub. Date: Sep. 2, 2021

(65) Prior Publication Data
US 2023/0023210 A1      Jan. 26, 2023

(30) Foreign Application Priority Data
Feb. 28, 2020     (GR) ............................... 20200100112

(51) Int. Cl.
*H04L 5/00*          (2006.01)

(52) U.S. Cl.
CPC ................................... *H04L 5/0057* (2013.01)

(58) Field of Classification Search
USPC ....... 370/216, 229, 236, 241, 242, 252, 254, 370/328, 329, 330
See application file for complete search history.

(56) References Cited

U.S. PATENT DOCUMENTS

| | | | |
|---|---|---|---|
| 10,396,955 B2 * | 8/2019 | Lee ..................... H04L 25/0204 |
| 2007/0254597 A1 * | 11/2007 | Li ........................ H04B 7/0632 |
| | | | 455/69 |

(Continued)

FOREIGN PATENT DOCUMENTS

| | | |
|---|---|---|
| CN | 104704786 A | 6/2015 |
| CN | 106559182 A | 4/2017 |

(Continued)

OTHER PUBLICATIONS

CATT: "On QCL for NR", 3GPP TSG RAN WG1 NR Ad-Hoc#2, R1-1710071, Qingdao, P.R. China, Jun. 27-30, 2017, 3 Pages.

(Continued)

*Primary Examiner* — Nguyen H Ngo
(74) *Attorney, Agent, or Firm* — Harrity & Harrity, LLP

(57) ABSTRACT

Various aspects of the present disclosure generally relate to wireless communication. In some aspects, a user equipment (UE) may receive a channel state information (CSI) report configuration indicating a time-domain reference signal bundling configuration assumption for CSI reporting in accordance with the CSI report configuration; and transmit a CSI report based at least in part on the time-domain reference signal bundling configuration assumption.

26 Claims, 5 Drawing Sheets

(56) References Cited

U.S. PATENT DOCUMENTS

| | | | |
|---|---|---|---|
| 2012/0033587 A1 | 2/2012 | Papasakellariou et al. | |
| 2014/0036804 A1 | 2/2014 | Chen et al. | |
| 2015/0289141 A1* | 10/2015 | Ghasemzadeh ... | H04W 72/0446 |
| | | | 370/330 |
| 2016/0226649 A1* | 8/2016 | Papasakellariou .... | H04L 5/0057 |
| 2016/0227424 A1 | 8/2016 | Chen et al. | |
| 2019/0104532 A1 | 4/2019 | Park et al. | |
| 2019/0222281 A1 | 7/2019 | Sirotkin et al. | |
| 2020/0107319 A1* | 4/2020 | Bagheri | H04W 72/23 |
| 2021/0235308 A1* | 7/2021 | Zhang | H04W 72/23 |
| 2021/0298038 A1* | 9/2021 | Kang | H04L 5/0057 |
| 2021/0391964 A1* | 12/2021 | Kwak | H04B 7/0456 |
| 2022/0286257 A1* | 9/2022 | Wu | H04B 7/0478 |
| 2022/0286261 A1* | 9/2022 | Wu | H04B 7/0663 |
| 2022/0302979 A1* | 9/2022 | Hao | H04B 7/048 |
| 2022/0330068 A1* | 10/2022 | Yuan | H04B 7/063 |

FOREIGN PATENT DOCUMENTS

| | | |
|---|---|---|
| CN | 109429552 A | 3/2019 |
| KR | 20170113464 A | 10/2017 |
| WO | WO-2013166697 A1 | 11/2013 |
| WO | WO-2016155840 A1 | 10/2016 |

OTHER PUBLICATIONS

Huawei., et al., "Evaluation Results of DMRS Design for DL/UL Data Channel", 3GPP TSG RAN WG1 Meeting #90bis, R1-1718247, Prague, Czech Republic, Oct. 9-13, 2017, 18 Pages.

Huawei, et al., "Remaining Issues for CSI Reporting", 3GPP TSG RAN WG1 Meeting #91, R1-1719425, 3rd Generation Partnership Project, Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 17, 2017, XP051369127, 9 Pages.

LG Electronics: "Discussion on Blind/HARQ-less PDSCH Repetition for URLLC", 3GPP TSG RAN WG1 Meeting #93, R1-1806598, Busan, Republic of Korea, May 21-25, 2018, 8 Pages.

Samsung: "Discussion on Transmission Parameter Sets", 3GPP TSG RAN WG1 NR Ad-Hoc#2, R1-1710650, No. Qingdao, P.R. China, Jun. 27, 2017-Jun. 30, 2017, 3 Pages, Jun. 30, 2017.

International Search Report and Written Opinion—PCT/US2021/018243—ISA/EPO—Jun. 14, 2021.

* cited by examiner

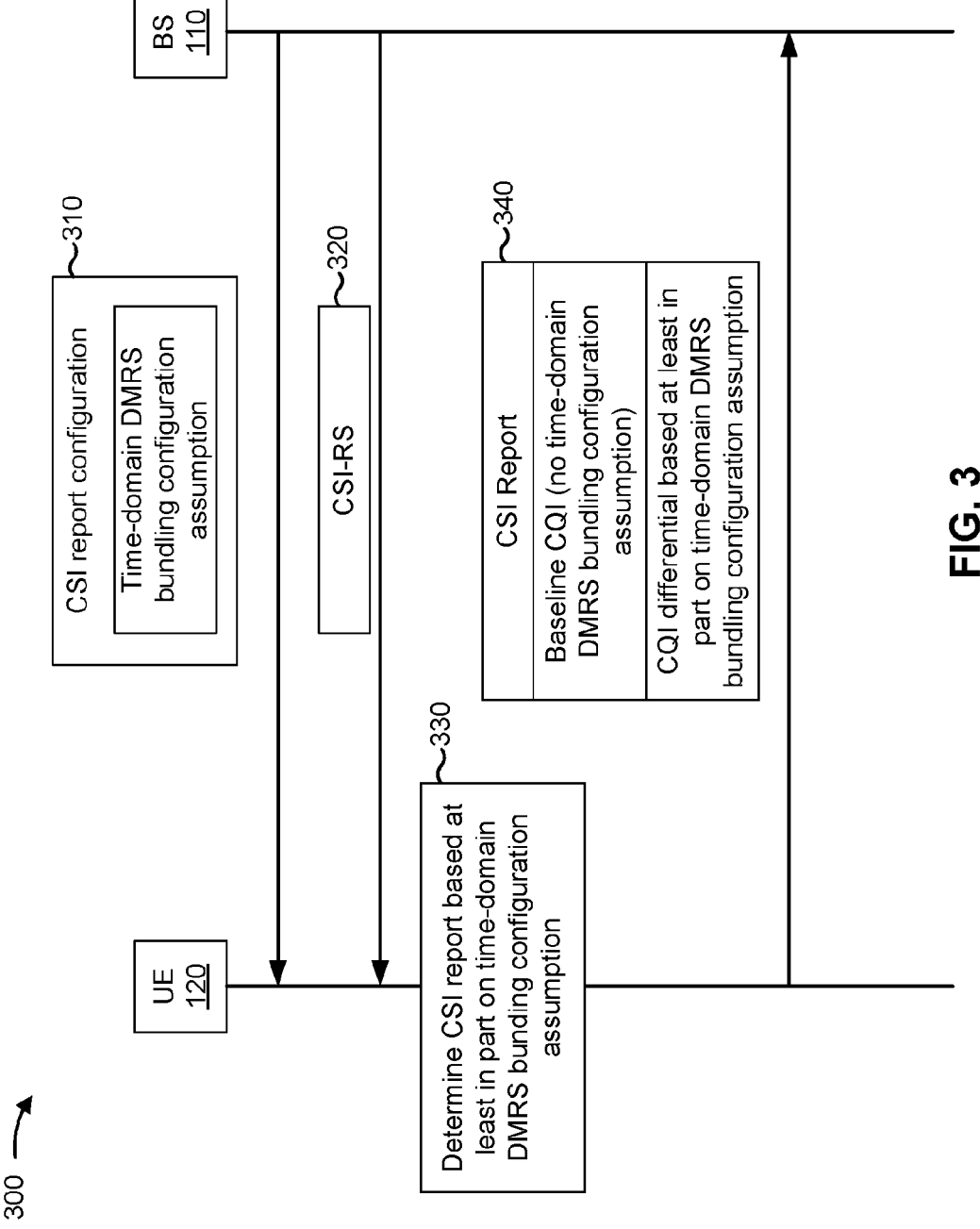

300

310

CSI report configuration

Time-domain DMRS bundling configuration assumption

BS 110

320

CSI-RS

330

Determine CSI report based at least in part on time-domain DMRS bunding configuration assumption

340

CSI Report

Baseline CQI (no time-domain DMRS bundling configuration assumption)

CQI differential based at least in part on time-domain DMRS bundling configuration assumption

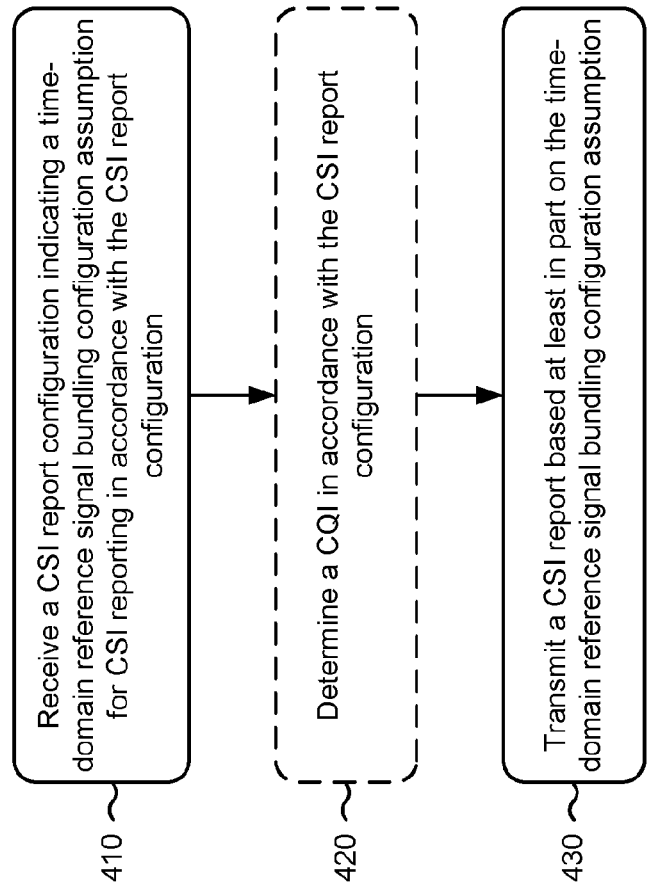

FIG. 4

410 — Receive a CSI report configuration indicating a time-domain reference signal bundling configuration assumption for CSI reporting in accordance with the CSI report configuration 420 — Determine a CQI in accordance with the CSI report configuration 430 — Transmit a CSI report based at least in part on the time-domain reference signal bundling configuration assumption

400

500

510 — Transmit a CSI report configuration indicating a time-domain reference signal bundling configuration assumption for CSI reporting 520 — Receive a CSI report based at least in part on the time-domain reference signal bundling configuration assumption

CHANNEL STATE INFORMATION REPORT FOR BUNDLED DOWNLINK SHARED CHANNEL

CROSS-REFERENCE TO RELATED APPLICATIONS

This Patent Application is a 371 national stage of PCT Application PCT/US2021/018243, filed on Feb. 16, 2021, entitled "CHANNEL STATE INFORMATION REPORT FOR BUNDLED DOWNLINK SHARED CHANNEL," which claims priority to Greece Patent Application Serial No. 20200100112, filed on Feb. 28, 2020, entitled "CHANNEL STATE INFORMATION REPORT FOR BUNDLED DOWNLINK SHARED CHANNEL," which are hereby expressly incorporated by reference herein.

FIELD OF THE DISCLOSURE

Aspects of the present disclosure generally relate to wireless communication and to techniques and apparatuses for channel state information (CSI) reporting for a bundled downlink shared channel

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving a channel state information (CSI) report configuration indicating a time-domain reference signal bundling configuration assumption for channel quality indication (CQI) reporting; determining CQI in accordance with the CSI report configuration; and transmitting a CSI report including the CQI.

In some aspects, a method of wireless communication, performed by a base station, may include transmitting a CSI report configuration indicating a time-domain reference signal bundling configuration assumption for CQI reporting; and receiving a CSI report including CQI determined in accordance with the CSI report configuration.

In some aspects, a UE for wireless communication may include a memory and one or more processors operatively coupled to the memory. The memory and the one or more processors may be configured to receive a CSI report configuration indicating a time-domain reference signal bundling configuration assumption for CQI reporting; determine a CQI in accordance with the CSI report configuration; and transmit a CSI report including the CQI.

In some aspects, a base station for wireless communication may include a memory and one or more processors operatively coupled to the memory. The memory and the one or more processors may be configured to transmit a CSI report configuration indicating a time-domain reference signal bundling configuration assumption for CQI reporting; and receive a CSI report including CQI determined in accordance with the CSI report configuration.

In some aspects, a non-transitory computer-readable medium may store one or more instructions for wireless communication. The one or more instructions, when executed by one or more processors of a UE, may cause the one or more processors to receive a CSI report configuration indicating a time-domain reference signal bundling configuration assumption for CQI reporting; determine a CQI in accordance with the CSI report configuration; and transmit a CSI report including the CQI.

In some aspects, a non-transitory computer-readable medium may store one or more instructions for wireless communication. The one or more instructions, when executed by one or more processors of a base station, may cause the one or more processors to transmit a CSI report configuration indicating a time-domain reference signal bundling configuration assumption for CQI reporting; and receive a CSI report including CQI determined in accordance with the CSI report configuration.

In some aspects, an apparatus for wireless communication may include means for receiving a CSI report configuration indicating a time-domain reference signal bundling configuration assumption for CQI reporting; means for determining CQI in accordance with the CSI report configuration; and means for transmitting a CSI report including the CQI.

In some aspects, an apparatus for wireless communication may include means for transmitting a CSI report configuration indicating a time-domain reference signal bundling configuration assumption for CQI reporting; and means for receiving a CSI report including CQI determined in accordance with the CSI report configuration.

In some aspects, a method of wireless communication, performed by a UE, may include receiving a CSI report configuration indicating a time-domain reference signal bundling configuration assumption for CSI reporting in accordance with the CSI report configuration; and transmitting a CSI report based at least in part on the time-domain reference signal bundling configuration assumption.

In some aspects, a method of wireless communication, performed by a base station, may include transmitting a CSI report configuration indicating a time-domain reference signal bundling configuration assumption for CSI reporting; and receiving a CSI report based at least in part on the time-domain reference signal bundling configuration assumption.

In some aspects, a UE for wireless communication may include a memory and one or more processors operatively coupled to the memory. The memory and the one or more processors may be configured to receive a CSI report configuration indicating a time-domain reference signal bundling configuration assumption for CSI reporting in accordance with the CSI report configuration; and transmit a CSI report based at least in part on the time-domain reference signal bundling configuration assumption.

In some aspects, a base station for wireless communication may include a memory and one or more processors operatively coupled to the memory. The memory and the one or more processors may be configured to transmit a CSI report configuration indicating a time-domain reference signal bundling configuration assumption for CSI reporting; and receive a CSI report based at least in part on the time-domain reference signal bundling configuration assumption.

In some aspects, a non-transitory computer-readable medium may store one or more instructions for wireless communication. The one or more instructions, when executed by one or more processors of a UE, may cause the one or more processors to receive a CSI report configuration indicating a time-domain reference signal bundling configuration assumption for CSI reporting in accordance with the CSI report configuration; and transmit a CSI report based at least in part on the time-domain reference signal bundling configuration assumption.

In some aspects, a non-transitory computer-readable medium may store one or more instructions for wireless communication. The one or more instructions, when executed by one or more processors of a base station, may cause the one or more processors to transmit a CSI report configuration indicating a time-domain reference signal bundling configuration assumption for CSI reporting; and receive a CSI report based at least in part on the time-domain reference signal bundling configuration assumption.

In some aspects, an apparatus for wireless communication may include means for receiving a CSI report configuration indicating a time-domain reference signal bundling configuration assumption for CSI reporting in accordance with the CSI report configuration; and means for transmitting a CSI report based at least in part on the time-domain reference signal bundling configuration assumption.

In some aspects, an apparatus for wireless communication may include means for transmitting a CSI report configuration indicating a time-domain reference signal bundling configuration assumption for CSI reporting; and means for receiving a CSI report based at least in part on the time-domain reference signal bundling configuration assumption.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of determining channel state information reporting in accordance with a time-domain demodulation reference signal (DMRS) bundling configuration assumption, in accordance with the present disclosure.

FIG. 4 is a diagram illustrating an example process performed, for example, by a user equipment, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
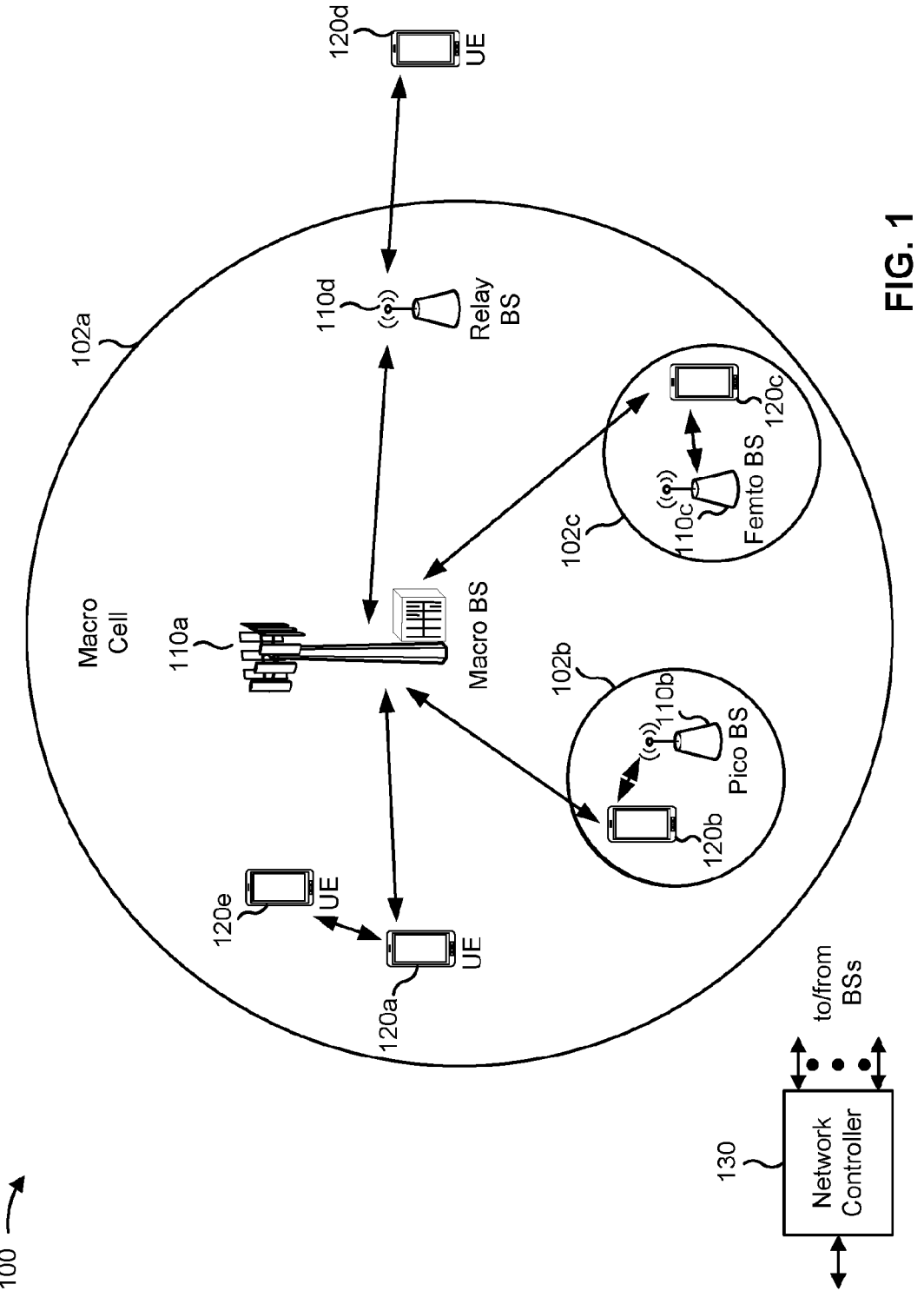
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
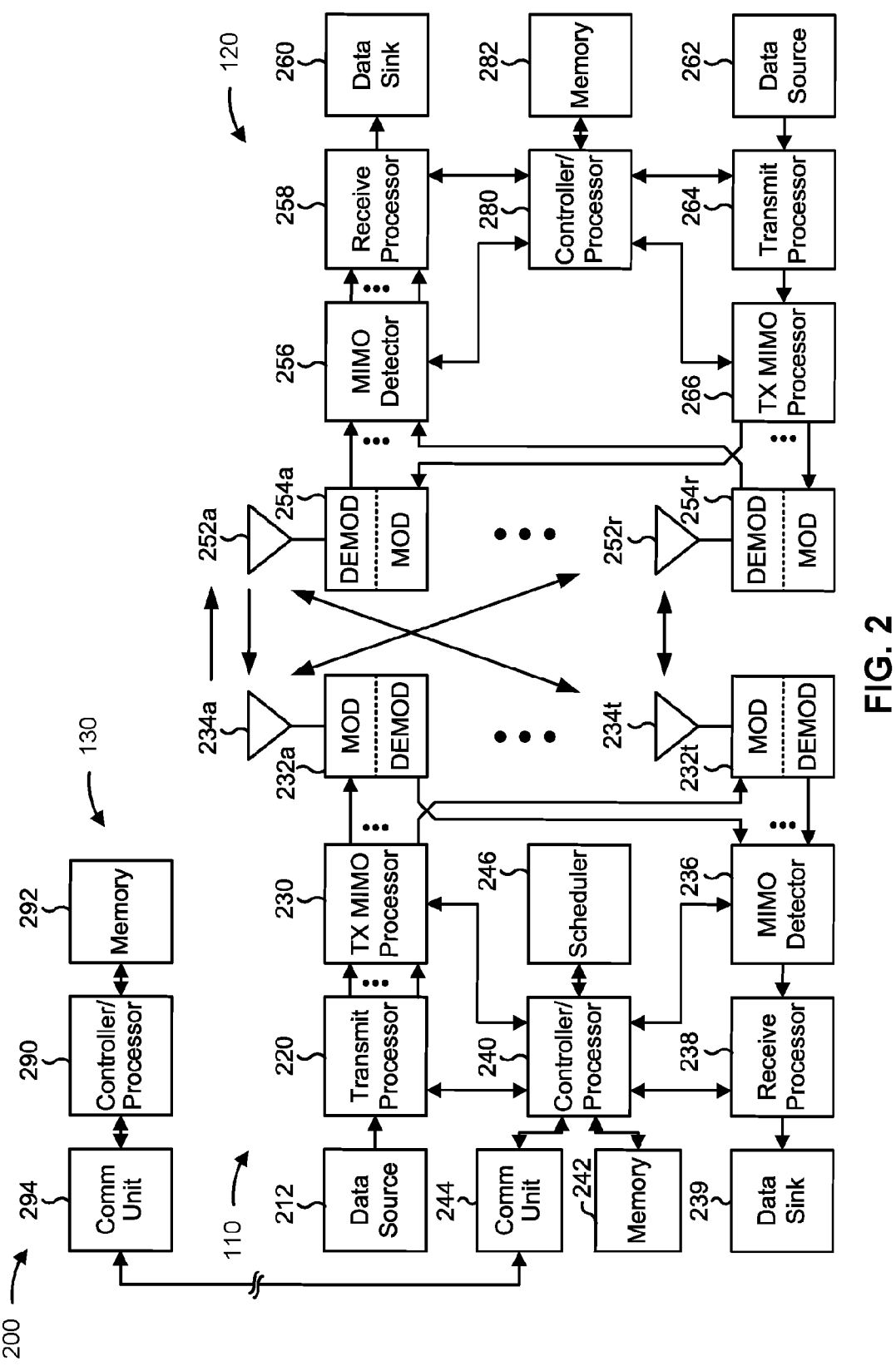
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-5.

Controller/processor 240 of base station 110, controller/processor 280 of UE 120, and/or any other component(s) of FIG. 2 may perform one or more techniques associated with channel state information (CSI) reporting for a bundled downlink shared channel, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, UE 120 may include means for receiving a CSI report configuration indicating a time-domain reference signal bundling configuration assumption for CQI reporting; means for determining CQI in accordance with the CSI report configuration; means for transmitting a CSI report including the CQI; means for receiving a CSI reference signal (CSI-RS) transmission, wherein the CSI report is based at least in part on the CSI-RS transmission, and wherein a same set of ports is transmitted across multiple symbols and multiple slots of the CSI-RS transmission; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a CSI report configuration indicating a time-domain reference signal bundling configuration assumption for CQI reporting; means for receiving a CSI report including CQI determined in accordance with the CSI report configuration; means for transmitting a CSI-RS transmission, wherein the CSI report is based at least in part on the CSI-RS transmission, and wherein a same set of ports is transmitted across multiple symbols and multiple slots of the CSI-RS transmission; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A transmission in a wireless network may carry an information-bearing signal which is modulated onto a carrier wave. Demodulation is the process of extracting the information-bearing signal from the carrier wave. A UE may demodulate a transmission (e.g., a physical downlink shared channel (PDSCH) transmission or another type of transmission) based at least in part on a reference signal, referred to herein as a demodulation reference signal (DMRS). The UE may estimate the radio channel based at least in part on the DMRS and may demodulate a PDSCH based at least in part on estimating the radio channel In some cases, multiple PDSCHs are bundled in the time domain for the DMRS, meaning that a single DMRS is used to demodulate multiple PDSCHs that are distributed in time. This may provide coverage enhancement, improved mobility, reduced DMRS signaling overhead, and increased peak throughput. Examples of time-domain reference signal bundling configurations include a look-ahead bundling configuration, in which the UE receives control information indicating a set of PDSCHs that are bundled with regard to a DMRS, and a look-behind bundling configuration, in which downlink control information (DCI) for a corresponding PDSCH includes an indicator of whether the corresponding PDSCH is bundled with a previous PDSCH.

A UE may provide CSI that includes information associated with a channel between the UE and a base station. For example, the UE may provide the CSI in a CSI report. The CSI report may include, for example, a channel quality indicator (CQI), a precoder matrix indicator (PMI), a rank indicator (RI), a layer indicator (LI), a Layer 1 reference signal received power (L1-RSRP) value, and/or the like. For example, the CSI report may include a set of fields in a specified order indicating such information. A single uplink transmission (e.g., on a physical uplink shared channel (PUSCH) or a physical uplink control channel (PUCCH)) may include multiple CSI reports which may be arranged according to priority. For example, the arrangement of the multiple CSI reports may be based at least in part on a report periodicity, a report type, a serving cell index, and/or a CSI report configuration of the UE. The UE may determine CSI feedback based at least in part on a CSI-RS, such as a non-zero-power CSI-RS (NZP-CSI-RS). For example, a linkage may be defined between an instance of the CSI-RS and the corresponding CSI report, and the UE may generate the corresponding CSI report based at least in part on the CSI-RS according to the linkage.

In some aspects, a UE may provide two-part CSI feedback. Two-part CSI feedback may include a first part with a configured payload size and a second part with a variable payload size. The second part may be based at least in part on the content of the first part. In the case when multiple two-part CSI reports are provided in a single uplink transmission, the first parts of the multiple two-part CSI reports may be grouped and jointly encoded, whereas the second parts may be encoded separately. A number of coded bits or symbols to be output after encoding and rate matching may be computed based at least in part on a number of input bits.

An element of a CSI report may be associated with a wideband frequency granularity or a sub-band frequency granularity. Furthermore, some elements of a CSI report may be associated with a wideband frequency granularity, and other elements of the CSI report may be associated with a sub-band frequency granularity. An element of a CSI report with a wideband frequency granularity may convey information regarding a wideband (e.g., an entire CSI reporting bandwidth associated with the CSI report), whereas an element of a CSI report with a sub-band frequency granularity may convey information regarding a sub-band, where a sub-band is a frequency division of a wideband. For example, wideband PMI/CQI reporting, beam reporting, hybrid CSI report, semi-open loop reporting, and non-PMI feedback (with wideband CQI) may be classified as wideband frequency granularity CSI, whereas the other configurations of a CSI report setting may be classified as having a sub-band frequency granularity. Only CSI report settings with wideband frequency granularity may be allowed to be periodically reported on a short PUCCH. Which of the sub-band or wideband CSI is used may involve a trade-off between CSI accuracy and uplink control information (UCI) overhead. For example, depending on the conditions of uplink coverage of the UE, different amounts of bits can reliably be transmitted on the uplink. Thus, a UE with good uplink coverage could be configured with sub-band granularity PMI/CQI reporting (which may involve more overhead or a larger amount of bits), whereas a UE with poor uplink coverage may be configured with wideband PMI/CQI reporting (which may involve less overhead or a smaller amount of bits).

The CSI report setting may define the respective frequency granularity of the PMI and the CQI, which can be either wideband or sub-band. For wideband granularity PMI/CQI, a single PMI/CQI corresponding to the entire CSI reporting band may be reported, whereas for sub-band granularity PMI/CQI, a separate PMI/CQI may be reported for each constituent sub-band in the CSI reporting band. The sub-band CQI may be differentially encoded relative to a wideband CQI, and if sub-band CQI is configured, the wideband reference CQI per codeword may also be reported. Similarly, for a sub-band PMI, only part of the PMI (e.g., a $W_2$ matrix corresponding to an $i_2$ index) is reported per sub-band in addition to a single wideband PMI (an $i_1$ index). For each sub-band index s, a 2-bit sub-band differential CQI value may indicate an offset of a sub-band CQI index relative to a wideband CQI index.

It may be assumed, for CQI calculation purposes, that a random $W_2$ matrix is selected for each PRG, to mimic the gNB applying per-PRG precoder cycling. Here, the assumed PRG size for CQI calculation purposes may be explicitly configured in the CSI report setting, and may not be the same as the actual PRG size used for the PDSCH DMRS (in order to decouple the CSI feedback from data transmission and as the actual PRG size dynamically varies with DCI indication). In some aspects, the gNB may indicate which subset of the possible $W_2$ precoders the UE should randomly pick from via indication of a codebook subset restriction of the $i_2$ index.

The time-domain DMRS bundling configuration (or an activation or deactivation of the time-domain DMRS bundling configuration) may be indicated dynamically to a UE by a base station (e.g., a gNB). However, the configuration of CSI reporting for the UE may be performed on a semi-static basis, such as by using radio resource control (RRC) signaling. Thus, it may be difficult or impossible for the UE to switch between a CSI reporting configuration appropriate for time-domain DMRS bundling and a CSI reporting configuration for when time-domain DMRS bundling is not used. Furthermore, if the UE always performs CSI reporting based at least in part on an assumption that DMRS bundling is not performed, then channel conditions may tend to be underreported, thereby decreasing the likelihood that DMRS bundling is used and decreasing throughput. This issue may be exacerbated if the base station is not aware of whether the UE is performing CSI reporting based at least in part on an assumption that DMRS bundling is assumed in the associated CSI report.

Some techniques and apparatuses described herein provide configuration of an assumption for a time-domain DMRS bundling configuration. The UE may use the time-domain DMRS bundling configuration assumption to determine CSI feedback and/or perform CSI reporting. The CSI reporting can relate to any part of a CSI report, such as a CQI, a PMI, an RI, an LI, an L1-RSRP, or the like. For example, the UE may report a baseline CSI value (e.g., without using the time-domain DMRS bundling configuration assumption) and a differential that indicates a difference between the baseline CSI value and a CSI value determined using the time-domain DMRS bundling configuration assumption. In some aspects, the UE may process a CSI-RS based at least in part on the time-domain DMRS bundling configuration assumption or based at least in part on a CSI report configuration associated with the time-domain DMRS bundling configuration assumption. In this way, the UE may determine CSI feedback using a time-domain DMRS bundling configuration assumption, which reduces uncertainty associated with time-domain DMRS bundling, improves throughput, and improves network efficiency.

FIG. 3 is a diagram illustrating an example 300 of determining channel state information reporting in accordance with a time-domain DMRS bundling configuration assumption, in accordance with the present disclosure. As shown, example 300 includes a UE 120 and a BS 110.

As shown in FIG. 3, and by reference number 310, the BS 110 may provide a CSI report configuration to the UE 120. As further shown, the CSI report may indicate a time-domain DMRS bundling configuration assumption. For example, the time-domain DMRS bundling configuration assumption may indicate a number of PDSCHs that are time-domain bundled, an actual number of DMRS symbols per PDSCH to be assumed, a maximum number of DMRS symbols per PDSCH to be assumed, a precoding resource block group (PRG) size to be assumed, and/or the like. In the example where the CSI reporting is to indicate CQI, the time-domain DMRS bundling configuration assumption may indicate an actual number of DMRS symbols per PDSCH to be assumed for deriving CQI, a maximum number of DMRS symbols per PDSCH to be assumed for deriving CQI, a precoding resource block group (PRG) size to be assumed for deriving CQI, and/or the like.

In some aspects, the CSI report configuration may indicate whether the CSI report is for DMRS bundling of PDSCHs of the same transport block (e.g., with different redundancy versions or the same redundancy version) or for DMRS bundling of PDSCHs which may be provided of different transport blocks. In such a case, the CSI report may be different when DMRS bundling of PDSCHs of the same transport block (TB) is performed than when DMRS bundling of PDSCHs on different TBs is performed.

As shown by reference number 320, the BS 110 may transmit a CSI-RS to the UE 120. For example, the CSI-RS may be based at least in part on the time-domain DMRS bundling configuration assumption. In this case, the CSI-RS may be a non-zero-power (NZP)-CSI-RS in which the same ports are transmitted across multiple symbols across more than one slot. For example, the CSI-RS may span as many slots as the time-domain DMRS bundling configuration assumption indicates are associated with time-domain DMRS bundling. In some aspects, the CSI-RS may be associated with a CSI-RS resource. For example, the CSI-RS resource may span multiple slots (e.g., as many slots as the time-domain DMRS bundling configuration assumption indicates are associated with time-domain DMRS bundling). As another example, the CSI-RS may be associated with a CSI-RS resource set that includes multiple CSI-RS resources, wherein each resource is configured within a slot. In this case, the same port may be configured for all of the CSI-RS resources of the CSI-RS resource set.

As shown by reference number 330, the UE 120 may determine a CSI report (e.g., CQI, PMI, RI, LI, L1-RSRP, and/or the like), based at least in part on the time-domain DMRS bundling configuration assumption. For example, the UE 120 may determine the CSI report using the CSI-RS indicated by reference number 320 and based at least in part on the time-domain DMRS bundling configuration assumption (e.g., the number of PDSCHs that are time-domain bundled, the actual number of DMRS symbols per PDSCH to be assumed, the maximum number of DMRS symbols per PDSCH to be assumed, the PRG size to be assumed, and/or the like). In some aspects, the UE 120 may determine a baseline CSI value such as a baseline CQI (e.g., without the time-domain DMRS bundling configuration assumption) and a differential relative to the baseline CSI value such as the baseline CQI. The UE 120 may report the baseline CSI value and the differential, as described below.

In some aspects, the UE 120 may determine a CQI based at least in part on one or more other assumptions (e.g., other than the time-domain DMRS bundling configuration assumption). For example, the UE 120 may determine the CQI, RI, and/or PMI based at least in part on one or more of the following assumptions:

The first 2 OFDM symbols are occupied by control signaling.

The number of PDSCH and DM-RS symbols is equal to 12.

The same bandwidth part subcarrier spacing configured as for the PDSCH reception.

The bandwidth as configured for the corresponding CQI report.

The reference resource uses the cyclic prefix (CP) length and subcarrier spacing configured for PDSCH reception.

No resource elements used by primary or secondary synchronization signals or physical broadcast channel Redundancy Version 0.

The ratio of PDSCH energy per resource element (EPRE) to CSI-RS EPRE is as given in Subclause 4.1 of 3GPP Technical Specification 38.214.

Assume no REs allocated for non-zero-power (NZP) CSI-RS and zero-power (ZP) CSI-RS.

Assume the same number of front loaded demodulation reference signal (DM-RS) symbols as the maximum front-loaded symbols configured by the higher layer parameter maxLength in DMRS-DownlinkConfig.

Assume the same number of additional DM-RS symbols as the additional symbols configured by the higher layer parameter dmrs-AdditionalPosition.

Assume the PDSCH symbols are not containing DM-RS.

Assume physical resource block (PRB) bundling size of 2 PRBs.

As shown by reference number 340, the UE 120 may provide the CSI report. As further shown, in example 300, the CSI report may indicate a baseline CQI and a CQI differential. The baseline CQI may be a CQI determined without using the time-domain DMRS bundling configuration assumption. For example, the baseline CQI may be a wideband CQI or a sub-band CQI. In some aspects, the CQI differential may be a 1-bit indicator. For example, the 1-bit indicator may indicate whether the CQI using the time-domain DMRS bundling configuration assumption is equal to the baseline CQI or is a different CQI (e.g., an incrementally higher CQI and/or the like). Thus, signaling overhead of the CQI differential may be reduced relative to reporting a multi-bit indicator. Furthermore, the accuracy and efficiency of the differential may not be significantly reduced, since the bundling CQI is likely to be higher than the baseline CQI due to the usage of time-domain DMRS bundling. In some aspects, the CSI report may indicate a baseline CSI value (e.g., PMI, RI, LI, L1-RSRP, determined without using the time-domain DMRS bundling configuration assumption) and a differential relative to the baseline CSI value.

As indicated above, FIG. 3 is provided as an example. Other examples may differ from what is described with respect to FIG. 3.

FIG. 4 is a diagram illustrating an example process 400 performed, for example, by a UE, in accordance with the present disclosure. Example process 400 is an example where the UE (e.g., UE 120 and/or the like) performs operations associated with CSI reporting for a DMRS-bundled PDSCH.

As shown in FIG. 4, in some aspects, process 400 may include receiving a CSI report configuration indicating a time-domain reference signal bundling configuration assumption for CSI reporting in accordance with the CSI report configuration (block 410). For example, the UE (e.g., using antenna 252, DEMOD 254, MIMO detector 256, receive processor 258, controller/processor 280, and/or the like) may receive a CSI report configuration indicating a time-domain reference signal bundling configuration assumption for CSI reporting in accordance with the CSI report configuration, as described above in connection with FIG. 3. The time-domain reference signal bundling configuration assumption may be a time-domain DMRS bundling configuration assumption.

In some aspects, the time-domain reference signal bundling configuration assumption indicates at least one of: a number of shared channels to be bundled for a reference signal, an assumed number of reference signal symbols per shared channel for determining the CSI report, an assumed maximum number of reference signal symbols per shared channel for determining the CSI report, or an assumed precoding resource group size for determining the CSI report. In some aspects, the CSI report configuration indicates whether the time-domain reference signal bundling configuration assumption is for shared channel bundling of a same transport block or of different transport blocks.

In some aspects, process 400 includes receiving a CSI reference signal (CSI-RS) transmission, wherein the CSI report is being based at least in part on the CSI-RS transmission, and wherein a same set of ports is transmitted across multiple symbols and multiple slots of the CSI-RS transmission. In some aspects, the CSI-RS transmission spans a number of slots equal to a number of slots across which time-domain reference signal bundling is assumed in the associated CSI report. In some aspects, the CSI-RS transmission uses a single CSI resource that spans the multiple slots. In some aspects, the CSI-RS transmission uses a set of respective CSI resources corresponding to the multiple slots, and each CSI resource, of the set of respective CSI resources, is configured with the same set of ports.

As further shown in FIG. 4, in some aspects, process 400 may include determining a CQI in accordance with the CSI report configuration (block 420). For example, the UE (e.g., using antenna 252, DEMOD 254, MIMO detector 256, receive processor 258, controller/processor 280, and/or the like) may optionally (as indicated by the dashed outline of block 420) determine a CQI in accordance with the CSI report configuration, as described above in connection with FIG. 3.

As further shown in FIG. 4, in some aspects, process 400 may include transmitting a CSI report based at least in part on the time-domain reference signal bundling configuration assumption (block 430). For example, the UE (e.g., using controller/processor 280, transmit processor 264, TX MIMO processor 266, MOD 254, antenna 252, and/or the like) may transmit a CSI report, as described above in connection with FIG. 3. The CSI report may be based at least in part on the time-domain reference signal bundling configuration assumption.

In some aspects, the CSI report includes a CQI determined based at least in part on the time-domain reference signal bundling configuration assumption. In some aspects, transmitting the CSI report further comprises transmitting a baseline CQI determined without using the time-domain reference signal bundling configuration assumption and a differential, relative to the baseline CQI, indicating a CQI determined using the time-domain reference signal bundling configuration assumption. In some aspects, the differential is relative to wideband CQI of the baseline CQI. In some aspects, the differential is relative to sub-band CQI of the baseline CQI. In some aspects, the differential comprises a bit indicating whether the CQI determined using the time-domain reference signal bundling configuration assumption is different than the baseline CQI.

In some aspects, the CSI report is different when the time-domain reference signal bundling configuration assumption is for shared channel bundling of a same transport block than when the time-domain reference signal bundling configuration is for shared channel bundling of different transport blocks.

Process 400 may include additional aspects, such as any single aspect or any combination of aspects described above and/or in connection with one or more other processes described elsewhere herein.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
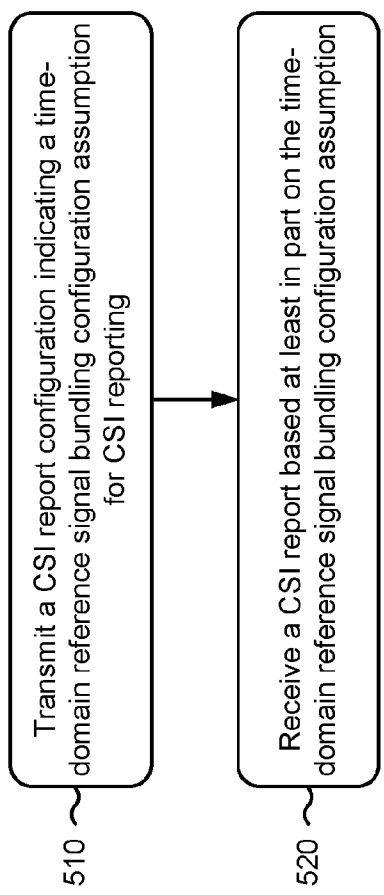
FIG. 5 is a diagram illustrating an example process performed, for example, by a base station, in accordance with the present disclosure.

FIG. 5 is a diagram illustrating an example process 500 performed, for example, by a base station, in accordance with the present disclosure. Example process 500 is an example where the base station (e.g., BS 110, such as a gNB, and/or the like) performs operations associated with CSI reporting for DMRS-bundled PDSCHs.

As shown in FIG. 5, in some aspects, process 500 may include transmitting a CSI report configuration indicating a time-domain reference signal bundling configuration assumption for CSI reporting (block 510). For example, the base station (e.g., using controller/processor 240, transmit processor 220, TX MIMO processor 230, MOD 232, antenna 234, and/or the like) may transmit a CSI report configuration indicating a time-domain reference signal bundling configuration assumption for CSI reporting, as described above in connection with FIG. 3. In some aspects, the CSI reporting may include CQI reporting.

In some aspects, the time-domain reference signal bundling configuration assumption indicates at least one of: a number of shared channels to be bundled for a reference signal, an assumed number of reference signal symbols per shared channel for determining the CSI report, an assumed maximum number of reference signal symbols per shared channel for determining the CSI report, or an assumed precoding resource group size for determining the CSI report.

In some aspects, the CSI report configuration indicates whether the time-domain reference signal bundling configuration assumption is for shared channel bundling of a same transport block or of different transport blocks.

In some aspects, the CSI report is different when the time-domain reference signal bundling configuration assumption is for shared channel bundling of a same transport block than when the time-domain reference signal bundling configuration is for shared channel bundling of different transport blocks.

In some aspects, process 500 includes transmitting a CSI-RS transmission, wherein the CSI report is based at least in part on the CSI-RS transmission, and wherein a same set of ports is transmitted across multiple symbols and multiple slots of the CSI-RS transmission.

In some aspects, the CSI-RS transmission spans a number of slots equal to a number of slots across which time-domain reference signal bundling is assumed in the associated CSI report. In some aspects, the CSI-RS transmission uses a single CSI resource that spans the multiple slots. In some aspects, the CSI-RS transmission uses a set of respective CSI resources corresponding to the multiple slots, where each CSI resource, of the set of respective CSI resources, is configured with the same set of ports.

As further shown in FIG. 5, in some aspects, process 500 may include receiving a CSI report based at least in part on the time-domain reference signal bundling configuration assumption (block 520). For example, the base station (e.g., using antenna 234, DEMOD 232, MIMO detector 236, receive processor 238, controller/processor 240, and/or the like) may receive a CSI report based at least in part on the time-domain reference signal bundling configuration assumption, as described above in connection with FIG. 3.

In some aspects, the CSI report includes a CQI determined based at least in part on the time-domain reference signal bundling configuration assumption.

In some aspects, the CSI report includes a baseline CQI determined without using the time-domain reference signal bundling configuration assumption and a differential, relative to the baseline CQI, indicating a CQI determined using the time-domain reference signal bundling configuration assumption. In some aspects, the differential is relative to a wideband CQI of the baseline CQI. In some aspects, the differential is relative to a sub-band CQI of the baseline CQI. In some aspects, the differential comprises a bit indicating whether the CQI determined using the time-domain reference signal bundling configuration assumption is different than the baseline CQI.

Process 500 may include additional aspects, such as any single aspect or any combination of aspects described below and/or in connection with one or more other processes described elsewhere herein.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a user equipment (UE), comprising: receiving a channel state information (CSI) report configuration indicating a time-domain reference signal bundling configuration assumption for CSI reporting in accordance with the CSI report configuration; and transmitting a CSI report based at least in part on the time-domain reference signal bundling configuration assumption.

Aspect 2: The method of Aspect 1, wherein the CSI report includes a CQI determined based at least in part on the time-domain reference signal bundling configuration assumption.

Aspect 3: The method of Aspect 2, wherein transmitting the CSI report further comprises transmitting a baseline CQI determined without using the time-domain reference signal bundling configuration assumption and a differential, relative to the baseline CQI, indicating a CQI determined using the time-domain reference signal bundling configuration assumption.

Aspect 4: The method of Aspect 3, wherein the differential is relative to wideband CQI of the baseline CQI.

Aspect 5: The method of Aspect 3, wherein the differential is relative to sub-band CQI of the baseline CQI.

Aspect 6: The method of Aspect 3, wherein the differential comprises a bit indicating whether the CQI determined using the time-domain reference signal bundling configuration assumption is different than the baseline CQI.

Aspect 7: The method of any of Aspects 1-6, wherein the time-domain reference signal bundling configuration assumption indicates at least one of: a number of shared channels to be bundled for a reference signal, an assumed number of reference signal symbols per shared channel for determining the CSI report, an assumed maximum number of reference signal symbols per shared channel for determining the CSI report, or an assumed precoding resource group size for determining the CSI report.

Aspect 8: The method of any of Aspects 1-7, wherein the CSI report configuration indicates whether the time-domain reference signal bundling configuration assumption is for shared channel bundling of a same transport block or of different transport blocks.

Aspect 9: The method of Aspect 8, wherein the CSI report is different when the time-domain reference signal bundling configuration assumption is for shared channel bundling of a same transport block than when the time-domain reference signal bundling configuration is for shared channel bundling of different transport blocks.

Aspect 10: The method of any of Aspects 1-9, further comprising: receiving a CSI reference signal (CSI-RS) transmission, wherein the CSI report configuration is associated with the CSI-RS transmission, wherein the CSI report is based at least in part on the reception of the CSI-RS transmission, and wherein a same set of ports is transmitted across multiple symbols and multiple slots of the CSI-RS transmission.

Aspect 11: The method of Aspect 10, wherein the CSI-RS transmission spans a number of slots equal to a number of slots across which time-domain reference signal bundling is assumed in the associated CSI report.

Aspect 12: The method of Aspect 10, wherein the CSI-RS transmission uses a single CSI resource that spans the multiple slots.

Aspect 13: The method of Aspect 10, wherein the CSI-RS transmission uses a set of respective CSI resources corresponding to the multiple slots, wherein each CSI resource, of the set of respective CSI resources, is configured with the same set of one or more ports.

Aspect 14: A method of wireless communication performed by a base station, comprising: transmitting a channel state information (CSI) report configuration indicating a time-domain reference signal bundling configuration assumption for CSI reporting; and receiving a CSI report based at least in part on the time-domain reference signal bundling configuration assumption.

Aspect 15: The method of Aspect 14, wherein the CSI report includes a CQI determined based at least in part on the time-domain reference signal bundling configuration assumption.

Aspect 16: The method of Aspect 15, wherein the CSI report includes a baseline CQI determined without using the time-domain reference signal bundling configuration assumption and a differential, relative to the baseline CQI, indicating a CQI determined using the time-domain reference signal bundling configuration assumption.

Aspect 17: The method of Aspect 16, wherein the differential is relative to wideband CQI of the baseline CQI.

Aspect 18: The method of Aspect 16, wherein the differential is relative to sub-band CQI of the baseline CQI.

Aspect 19: The method of Aspect 16, wherein the differential comprises a bit indicating whether the CQI determined using the time-domain reference signal bundling configuration assumption is different than the baseline CQI.

Aspect 20: The method of any of Aspects 14-19, wherein the time-domain reference signal bundling configuration assumption indicates at least one of: a number of shared channels to be bundled for a reference signal, an assumed number of reference signal symbols per shared channel for determining the CSI report, an assumed maximum number of reference signal symbols per shared channel for determining the CSI report, or an assumed precoding resource group size for determining the CSI report.

Aspect 21: The method of any of Aspects 14-20, wherein the CSI report configuration indicates whether the time-domain reference signal bundling configuration assumption is for shared channel bundling of a same transport block or of different transport blocks.

Aspect 22: The method of Aspect 21, wherein the CSI report is different when the time-domain reference signal bundling configuration assumption is for shared channel bundling of a same transport block than when the time-domain reference signal bundling configuration is for shared channel bundling of different transport blocks.

Aspect 23: The method of any of Aspects 14-22, further comprising: transmitting a CSI reference signal (CSI-RS) transmission, wherein the CSI report configuration is associated with the CSI-RS transmission, wherein the CSI report is based at least in part on reception of the CSI-RS transmission, and wherein a same set of ports is transmitted across multiple symbols and multiple slots of the CSI-RS transmission.

Aspect 24: The method of Aspect 23, wherein the CSI-RS transmission spans a number of slots equal to a number of slots across which time-domain reference signal bundling is assumed in the associated CSI report.

Aspect 25: The method of Aspect 23, wherein the CSI-RS transmission uses a single CSI resource that spans the multiple slots.

Aspect 26: The method of Aspect 23, wherein the CSI-RS transmission uses a set of respective CSI resources corresponding to the multiple slots, wherein each CSI resource, of the set of respective CSI resources, is configured with the same set of ports.

Aspect 27: A method of wireless communication performed by a user equipment (UE), comprising: receiving a channel state information (CSI) report configuration indicating a time-domain reference signal bundling configuration assumption for CSI reporting; determining CQI in accordance with the CSI report configuration; and transmitting a CSI report based at least in part on the time-domain reference signal bundling configuration assumption.

Aspect 28: The method of Aspect 27, wherein transmitting the CSI report further comprises transmitting a baseline CQI determined without using the time-domain reference signal bundling configuration assumption and a differential, relative to the baseline CQI, indicating a CQI determined using the time-domain reference signal bundling configuration assumption.

Aspect 29: The method of Aspect 28, wherein the differential is relative to wideband CQI of the baseline CQI.

Aspect 30: The method of Aspect 28, wherein the differential is relative to subband CQI of the baseline CQI.

Aspect 31: The method of Aspect 28, wherein the differential comprises a bit indicating whether the CQI determined using the time-domain reference signal bundling configuration assumption is different than the baseline CQI.

Aspect 32: The method of any of Aspects 27-31, wherein the time-domain reference signal bundling configuration assumption indicates at least one of: a number of shared channels to be bundled for a reference signal, an assumed number of reference signal symbols per shared channel for determining the CQI, an assumed maximum number of reference signal symbols per shared channel for determining the CQI, or an assumed precoding resource group size for determining the CQI.

Aspect 33: The method of any of Aspects 27-32, wherein the CSI report configuration indicates whether the time-domain reference signal bundling configuration assumption is for shared channel bundling of a same transport block or of different transport blocks.

Aspect 34: The method of Aspect 33, wherein the CSI report is different when the time-domain reference signal bundling configuration assumption is for shared channel bundling of a same transport block than when the time-domain reference signal bundling configuration is for shared channel bundling of different transport blocks.

Aspect 35: The method of any of Aspects 27-34, further comprising: receiving a CSI reference signal (CSI-RS) transmission, wherein the CSI report configuration is associated with the CSI-RS transmission, wherein the CSI report is based at least in part on the reception of the CSI-RS transmission, and wherein a same set of ports is transmitted across multiple symbols and multiple slots of the CSI-RS transmission.

Aspect 36: The method of Aspect 35, wherein the CSI-RS transmission spans a number of slots equal to a number of slots across which time-domain reference signal bundling is assumed in the associated CSI report.

Aspect 37: The method of Aspect 35, wherein the CSI-RS transmission uses a single CSI resource that spans the multiple slots.

Aspect 38: The method of Aspect 35, wherein the CSI-RS transmission uses a set of respective CSI resources corresponding to the multiple slots, wherein each CSI resource, of the set of respective CSI resources, is configured with the same set of ports.

Aspect 39: A method of wireless communication performed by a base station, comprising: transmitting a channel state information (CSI) report configuration indicating a time-domain reference signal bundling configuration assumption for channel quality indication (CQI) reporting; and receiving a CSI report including CQI determined in accordance with the CSI report configuration.

Aspect 40: The method of Aspect 39, wherein the CSI report includes a baseline CQI determined without using the time-domain reference signal bundling configuration assumption and a differential, relative to the baseline CQI, indicating a CQI determined using the time-domain reference signal bundling configuration assumption.

Aspect 41: The method of Aspect 40, wherein the differential is relative to wideband CQI of the baseline CQI.

Aspect 42: The method of Aspect 40, wherein the differential is relative to subband CQI of the baseline CQI.

Aspect 43: The method of Aspect 40, wherein the differential comprises a bit indicating whether the CQI determined using the time-domain reference signal bundling configuration assumption is different than the baseline CQI.

Aspect 44: The method of any of Aspects 39-43, wherein the time-domain reference signal bundling configuration assumption indicates at least one of: a number of shared channels to be bundled for a reference signal, an assumed number of reference signal symbols per shared channel for determining the CQI, an assumed maximum number of reference signal symbols per shared channel for determining the CQI, or an assumed precoding resource group size for determining the CQI.

Aspect 45: The method of any of Aspects 39-44, wherein the CSI report configuration indicates whether the time-domain reference signal bundling configuration assumption is for shared channel bundling of a same transport block or of different transport blocks.

Aspect 46: The method of Aspect 45, wherein the CSI report is different when the time-domain reference signal bundling configuration assumption is for shared channel bundling of a same transport block than when the time-domain reference signal bundling configuration is for shared channel bundling of different transport blocks.

Aspect 47: The method of any of Aspects 39-46, further comprising: transmitting a CSI reference signal (CSI-RS) transmission, wherein the CSI report configuration is associated with the CSI-RS transmission, wherein the CSI report is based at least in part on reception of the CSI-RS transmission, and wherein a same set of ports is transmitted across multiple symbols and multiple slots of the CSI-RS transmission.

Aspect 48: The method of Aspect 47, wherein the CSI-RS transmission spans a number of slots equal to a number of slots across which time-domain reference signal bundling is assumed in the associated CSI report.

Aspect 49: The method of Aspect 47, wherein the CSI-RS transmission uses a single CSI resource that spans the multiple slots.

Aspect 50: The method of Aspect 47, wherein the CSI-RS transmission uses a set of respective CSI resources corresponding to the multiple slots, wherein each CSI resource, of the set of respective CSI resources, is configured with the same set of ports.

Aspect 51: An apparatus for wireless communication at a device, comprising a processor; memory coupled with the processor; and instructions stored in the memory and executable by the processor to cause the apparatus to perform the method of one or more Aspects of Aspects 1-50.

Aspect 52: A device for wireless communication, comprising a memory and one or more processors coupled to the memory, the memory and the one or more processors configured to perform the method of one or more Aspects of Aspects 1-50.

Aspect 53: An apparatus for wireless communication, comprising at least one means for performing the method of one or more Aspects of Aspects 1-50.

Aspect 54: A non-transitory computer-readable medium storing code for wireless communication, the code comprising instructions executable by a processor to perform the method of one or more Aspects of Aspects 1-50.

Aspect 55: A non-transitory computer-readable medium storing a set of instructions for wireless communication, the set of instructions comprising one or more instructions that, when executed by one or more processors of a device, cause the device to perform the method of one or more Aspects of Aspects 1-50.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving a channel state information (CSI) report configuration indicating a time-domain reference signal bundling configuration assumption for CSI reporting in accordance with the CSI report configuration; and
   transmitting a CSI report based at least in part on the time-domain reference signal bundling configuration assumption, wherein the CSI report includes a channel quality indication (CQI) based at least in part on the time-domain reference signal bundling configuration assumption, and wherein transmitting the CSI report further comprises transmitting a baseline CQI determined without the time-domain reference signal bundling configuration assumption and a differential, relative to the baseline CQI, indicating a CQI determined with the time-domain reference signal bundling configuration assumption.

2. The method of claim 1, wherein the differential is relative to wideband CQI of the baseline CQI.

3. The method of claim 1, wherein the differential is relative to sub-band CQI of the baseline CQI.

4. The method of claim 1, wherein the differential comprises a bit indicating whether the CQI determined using the time-domain reference signal bundling configuration assumption is different than the baseline CQI.

5. The method of claim 1, wherein the time-domain reference signal bundling configuration assumption indicates at least one of:
   a number of shared channels to be bundled for a reference signal,
   an assumed number of reference signal symbols per shared channel, of the number of shared channels, for determining the CSI report,
   an assumed maximum number of reference signal symbols per shared channel, of the number of shared channels, for determining the CSI report, or
   an assumed precoding resource group size for determining the CSI report.

6. The method of claim 1, wherein the CSI report configuration indicates whether the time-domain reference signal bundling configuration assumption is for bundling shared channels.

7. The method of claim 6, wherein the CSI report is different when the time-domain reference signal bundling configuration assumption is for bundling first shared channels associated with a same transport block than when the time-domain reference signal bundling configuration is for bundling second shared channels associated with different transport blocks.

8. The method of claim 1, further comprising:
   receiving a CSI reference signal (CSI-RS) transmission, wherein the CSI report configuration is associated with the CSI-RS transmission, wherein the CSI report is based at least in part on the reception of the CSI-RS transmission, and wherein a same set of ports is transmitted across multiple symbols and multiple slots of the CSI-RS transmission.

9. The method of claim 8, wherein the CSI-RS transmission spans a number of slots equal to a number of slots across which time-domain reference signal bundling is assumed in the CSI report.

10. The method of claim 8, wherein the CSI-RS transmission uses a single CSI resource that spans the multiple slots.

11. The method of claim 8, wherein the CSI-RS transmission uses a set of respective CSI resources corresponding to the multiple slots, wherein each CSI resource, of the set of respective CSI resources, is configured with the same set of one or more ports.

12. A method of wireless communication performed by a base station, comprising:
   transmitting a channel state information (CSI) report configuration indicating a time-domain reference signal bundling configuration assumption for CSI reporting; and
   receiving a CSI report based at least in part on the time-domain reference signal bundling configuration assumption, wherein the CSI report includes a channel quality indication (CQI) based at least in part on the time-domain reference signal bundling configuration assumption, and wherein receiving the CSI report further comprises receiving a baseline CQI determined without the time-domain reference signal bundling configuration assumption and a differential, relative to the baseline CQI, indicating a CQI determined with the time-domain reference signal bundling configuration assumption.

13. The method of claim 12, wherein the differential is relative to wideband CQI of the baseline CQI.

14. The method of claim 12, wherein the differential is relative to sub-band CQI of the baseline CQI.

15. The method of claim 12, wherein the differential comprises a bit indicating whether the CQI determined using the time-domain reference signal bundling configuration assumption is different than the baseline CQI.

16. The method of claim 12, wherein the time-domain reference signal bundling configuration assumption indicates at least one of:
   a number of shared channels to be bundled for a reference signal,
   an assumed number of reference signal symbols per shared channel, of the number of shared channels, for determining the CSI report,
   an assumed maximum number of reference signal symbols per shared channel, of the number of shared channels, for determining the CSI report, or
   an assumed precoding resource group size for determining the CSI report.

17. The method of claim 12, wherein the CSI report configuration indicates whether the time-domain reference signal bundling configuration assumption is for bundling shared channels.

18. The method of claim 17, wherein the CSI report is different when the time-domain reference signal bundling configuration assumption is for bundling first shared channels associated with a same transport block than when the time-domain reference signal bundling configuration is for bundling second shared channels associated with different transport blocks.

19. The method of claim 12, further comprising:

transmitting a CSI reference signal (CSI-RS) transmission, wherein the CSI report configuration is associated with the CSI-RS transmission, wherein the CSI report is based at least in part on reception of the CSI-RS transmission, and wherein a same set of ports is transmitted across multiple symbols and multiple slots of the CSI-RS transmission.

20. The method of claim 19, wherein the CSI-RS transmission spans a number of slots equal to a number of slots across which time-domain reference signal bundling is assumed in the CSI report.

21. The method of claim 19, wherein the CSI-RS transmission uses a single CSI resource that spans the multiple slots.

22. The method of claim 19, wherein the CSI-RS transmission uses a set of respective CSI resources corresponding to the multiple slots, wherein each CSI resource, of the set of respective CSI resources, is configured with the same set of ports.

23. A user equipment (UE) for wireless communication, comprising:

one or more memories; and one or more processors coupled to the one or more memories, the one or more processors configured to:

receive a channel state information (CSI) report configuration indicating a time-domain reference signal bundling configuration assumption for CSI reporting in accordance with the CSI report configuration; and transmit a CSI report based at least in part on the time-domain reference signal bundling configuration assumption, wherein the CSI report includes a channel quality indication (CQI) based at least in part on the time-domain reference signal bundling configuration assumption, and wherein, to transmit the CSI report, the one or more processors are further configured to transmit a baseline CQI determined without the time-domain reference signal bundling configuration assumption and a differential, relative to the baseline CQI, indicating a CQI determined with the time-domain reference signal bundling configuration assumption.

24. The UE of claim 23, wherein the one or more processors are further configured to:

receive a CSI reference signal (CSI-RS) transmission, wherein the CSI report configuration is associated with the CSI-RS transmission, wherein the CSI report is based at least in part on the reception of the CSI-RS transmission, and wherein a same set of ports is transmitted across multiple symbols and multiple slots of the CSI-RS transmission.

25. A network node for wireless communication, comprising:

one or more memories; and one or more processors coupled to the one or more memories, the one or more processors configured to:

transmit a channel state information (CSI) report configuration indicating a time-domain reference signal bundling configuration assumption for CSI reporting; and receive a CSI report based at least in part on the time-domain reference signal bundling configuration assumption, wherein the CSI report includes a channel quality indication (CQI) based at least in part on the time-domain reference signal bundling configuration assumption, and wherein, to receive the CSI report, the one or more processors are further configured to receive a baseline CQI determined without the time-domain reference signal bundling configuration assumption and a differential, relative to the baseline CQI, indicating a CQI determined with the time-domain reference signal bundling configuration assumption.

26. The network node of claim 25, wherein the one or more processors are further configured to:

transmit a CSI reference signal (CSI-RS) transmission, wherein the CSI report configuration is associated with the CSI-RS transmission, wherein the CSI report is based at least in part on the reception of the CSI-RS transmission, and wherein a same set of ports is transmitted across multiple symbols and multiple slots of the CSI-RS transmission.

* * * * *